United States Patent [19]
Grant

[11] Patent Number: 6,000,448
[45] Date of Patent: Dec. 14, 1999

[54] DELIMBER SYSTEM

[76] Inventor: Sonny Grant, P.O. Box 7186, Spanish Fort, Ala. 36577

[21] Appl. No.: 09/145,081

[22] Filed: Sep. 1, 1998

[51] Int. Cl.[6] .............................. A01G 23/06; B27L 1/00
[52] U.S. Cl. ...................... 144/24.13; 144/343; 173/120; 173/204
[58] Field of Search .................................. 144/4.1, 24.13, 144/338, 343; 173/118, 202, 204, 120

[56] References Cited

U.S. PATENT DOCUMENTS

| | | | |
|---|---|---|---|
| 5,107,912 | 4/1992 | Cote et al. | 144/338 |
| 5,148,843 | 9/1992 | Cote | 144/24.13 |
| 5,163,489 | 11/1992 | Ketonen | 144/4.1 |
| 5,249,613 | 10/1993 | Ridlur | 144/208 |
| 5,515,895 | 5/1996 | Hamby | 144/343 |
| 5,533,555 | 7/1996 | Hudson | 144/24.13 |

Primary Examiner—W. Donald Bray
Attorney, Agent, or Firm—Joseph N. Breaux

[57] ABSTRACT

An improvement to a delimber system having a delimbing unit including cutting elements, for cutting limbs extending from a tree trunk, and a tree trunk loader mechanism, for pulling the tree trunk of a tree to be delimbed through the delimbing unit such that the limbs extending from the tree trunk are severed from the tree trunk by the cutting elements. The improvement includes adding a base frame; a slide carriage mounted between the base frame and the delimbing unit such that the delimbing unit is slidable with respect to the base frame between a forward delimber position toward the tree trunk loader mechanism and a rearward delimber position away from the tree trunk loader mechanism; and an impact assembly mounted functionally between the base frame and the delimbing unit, the impact assembly including a force generating mechanism for generating a force transmitted between the base frame and the delimber unit to force the delimber unit into the rearward delimber position.

8 Claims, 4 Drawing Sheets

DELIMBER SYSTEM

TECHNICAL FIELD

The present invention relates to delimbing systems used in logging operations that include a delimbing unit including cutting elements for cutting limbs extending from a tree trunk and a tree trunk loader mechanism for pulling a trunk of a tree to be delimbed through the delimbing unit such that the limbs extending from the trunk are severed from the trunk by the cutting elements and more particularly to an improved delimber system wherein the improvement includes providing a slide carriage mounted to a base frame and an impact assembly, including a drive coupling, mounted to the base frame, and installing the delimbing unit on the slide carriage such that the delimbing unit is slidable between a forward delimber position and a rearward delimber position with respect to the base frame; and securing the drive coupling of the impact assembly functionally between the base frame and the delimber unit, the impact assembly moving the drive coupling, in response to a trigger signal, rapidly and forcefully in the rearward direction with sufficient force to drive the delimber unit between the forward position and the rearward position and supplying a large additional cutting force to the cutting elements of the delimbing unit for severing large limbs from the tree trunk.

BACKGROUND ART

Removing the limbs from the trunks of felled trees delimbing, is ordinarily an important element in the tree harvesting process. The delimbing is ordinarily accomplishes through the use of a delimbing system that includes a delimbing unit having cutting elements for severing the tree limbs extending from the tree trunk and a tree trunk loader mechanism having a mechanism for gripping and pulling the trunk of the tree to be delimbed through the delimbing unit such that the limbs extending from the trunk are severed from the trunk by a force generated between the loader mechanism and the cutting elements. Although this system works fine with equipment provided with normal horsepower ratings, this type of system can become stalled by one or more limbs that are too large for the loader mechanism to physically pull through the delimbing unit and severe from the tree trunk. What is needed, therefore, is an additional impact assembly that includes a triggering mechanism that could sense when the loader mechanism was providing a threshold limit force and which could then generate an additional severing impulse force between the delimber unit and the loader mechanism to severe the limb or limbs.

GENERAL SUMMARY DISCUSSION OF INVENTION

It is thus an object of the invention to provide an improved delimber system that includes an impact assembly installed between a delimbing unit and a loader mechanism for providing additional severing impact forces when needed to sever large limbs from a tree trunk.

It is a further object of the invention to provide an improved delimber system that includes delimber unit slidably mounted on a slide carriage mounted to a base frame and an impact assembly mounted between the base frame and the delimber unit for supplying an additional severing impact force between the loader mechanism and the cutting elements of the delimber unit for severing large limbs.

It is a still further object of the invention to provide an improved delimber system including a delimbing unit including cutting elements, for cutting limbs extending from a tree trunk, and a tree trunk loader mechanism, for pulling the tree trunk of a tree to be delimbed through the delimbing unit such that the limbs extending from the tree trunk are severed from the tree trunk by the cutting elements; the improvement including adding a base frame; a slide carriage mounted between the base frame and the delimbing unit such that the delimbing unit is slidable with respect to the base frame between a forward delimber position toward the tree trunk loader mechanism and a rearward delimber position away from the tree trunk loader mechanism; and an impact assembly mounted functionally between the base frame and the delimbing unit, the impact assembly including a force generating mechanism for generating a force transmitted between the base frame and the delimber unit to force the delimber unit into the rearward delimber position.

It is a still further object of the invention to provide an improved delimber system that accomplishes some or all of the above objects in combination.

Accordingly, an improved delimber system is provided. The improvement is to a delimber system including a delimbing unit including cutting elements, for cutting limbs extending from a tree trunk, and a tree trunk loader mechanism, for pulling the tree trunk of a tree to be delimbed through the delimbing unit such that the limbs extending from the tree trunk are severed from the tree trunk by the cutting elements. The improvement comprises adding a base frame; a slide carriage mounted between the base frame and the delimbing unit such that the delimbing unit is slidable with respect to the base frame between a forward delimber position toward the tree trunk loader mechanism and a rearward delimber position away from the tree trunk loader mechanism; and an impact assembly mounted functionally between the base frame and the delimbing unit, the impact assembly including a force generating mechanism for generating a force transmitted between the base frame and the delimber unit to force the delimber unit into the rearward delimber position.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
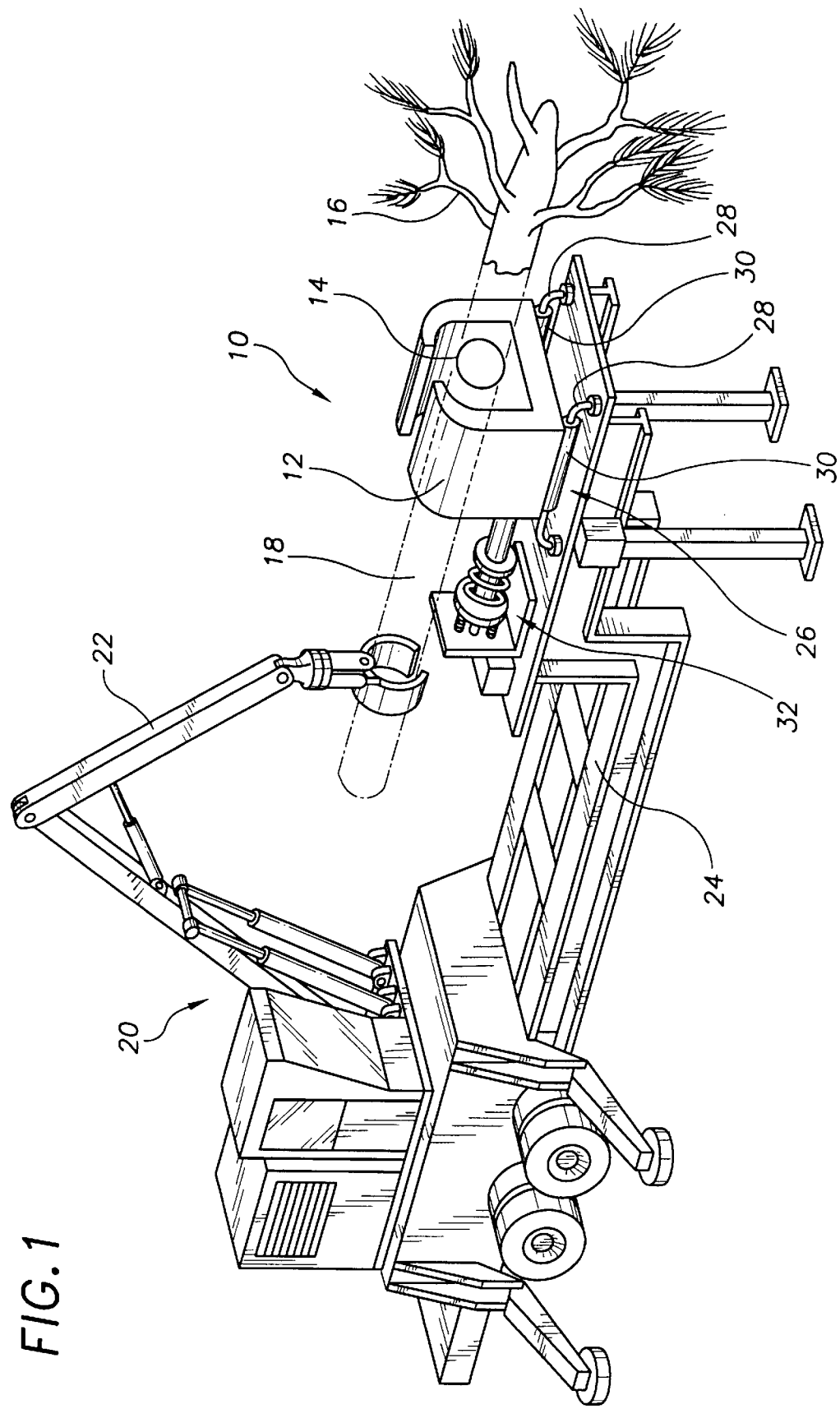
FIG. 1 is a perspective view of a representative delimber system having a delimbing unit including cutting elements for cutting limbs extending from a tree trunk and a tree trunk loader mechanism for pulling a trunk of a tree to be delimbed through the delimbing unit such that the limbs extending from the trunk are severed from the trunk by the cutting elements; the representative delimber system being improved according to an exemplary embodiment of the invention by providing a slide carriage mounted to a base frame and an impact assembly, including a drive coupling, mounted to the base frame, and installing the delimbing unit on the slide carriage such that the delimbing unit is slidable between a forward delimber position and a rearward delimber position with respect to the base frame; and securing the drive coupling of the impact assembly functionally between the base frame and the delimber unit, the impact assembly moving the drive coupling, in response to a trigger signal, rapidly in the rearward direction with sufficient force to drive the delimber unit between the forward position and the rearward position and supplying a large additional cutting force to the cutting elements of the delimbing unit for severing large limbs from the tree trunk.

FIG. 1 shows a representative delimber system, generally designated 10, having a delimbing unit 12 including cutting elements 14 for cutting limbs 16 extending from a tree trunk 18 and a tree trunk loader mechanism, generally designated 20, for pulling tree trunk 18 through delimbing unit 12 with a loader gripping arm 22. Tree trunk loader mechanism 20 is mounted to a trailer bed that functions as the base frame 24 of the exemplary improved delimber system. The improved delimber system also includes a slide carriage, generally designated 26, including two slide rods 28 mounted to base frame 24 and two carriage slides 30 rigidly mounted to the bottom of delimber unit 12 and slidable on slide rods 28 between a forward delimber position toward tree trunk loader mechanism 20 and a rearward delimber position away from tree trunk loader mechanism 20; and an impact assembly, generally designated 32, mounted between base frame 24 and delimber unit 12.

Figure 2:
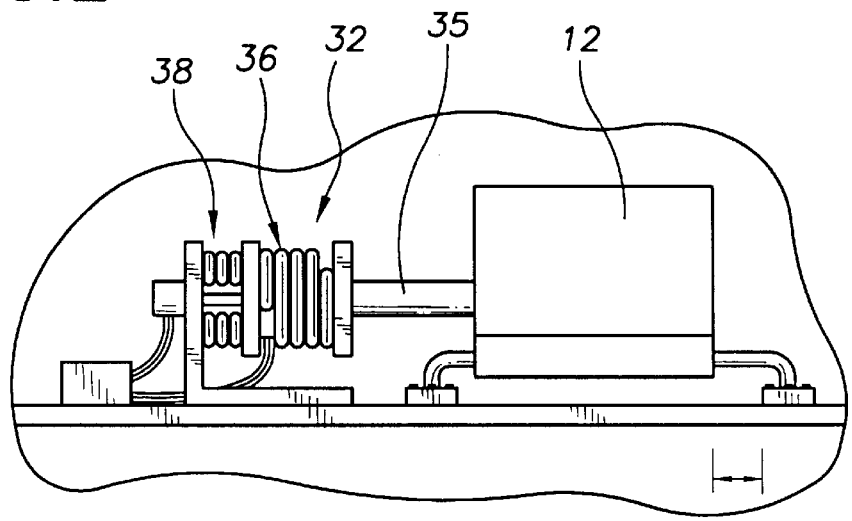
FIG. 2 is a side plan view showing an exemplary embodiment of the slide carriage mounted to the base frame; the impact assembly including the drive coupling mounted to the base frame; the delimbing unit installed on the slide carriage such that the delimbing unit is slidable between a forward delimber position and a rearward delimber position with respect to the base frame; and the drive coupling of the impact assembly functionally secured between the base frame and the delimber unit.
Figure 3:
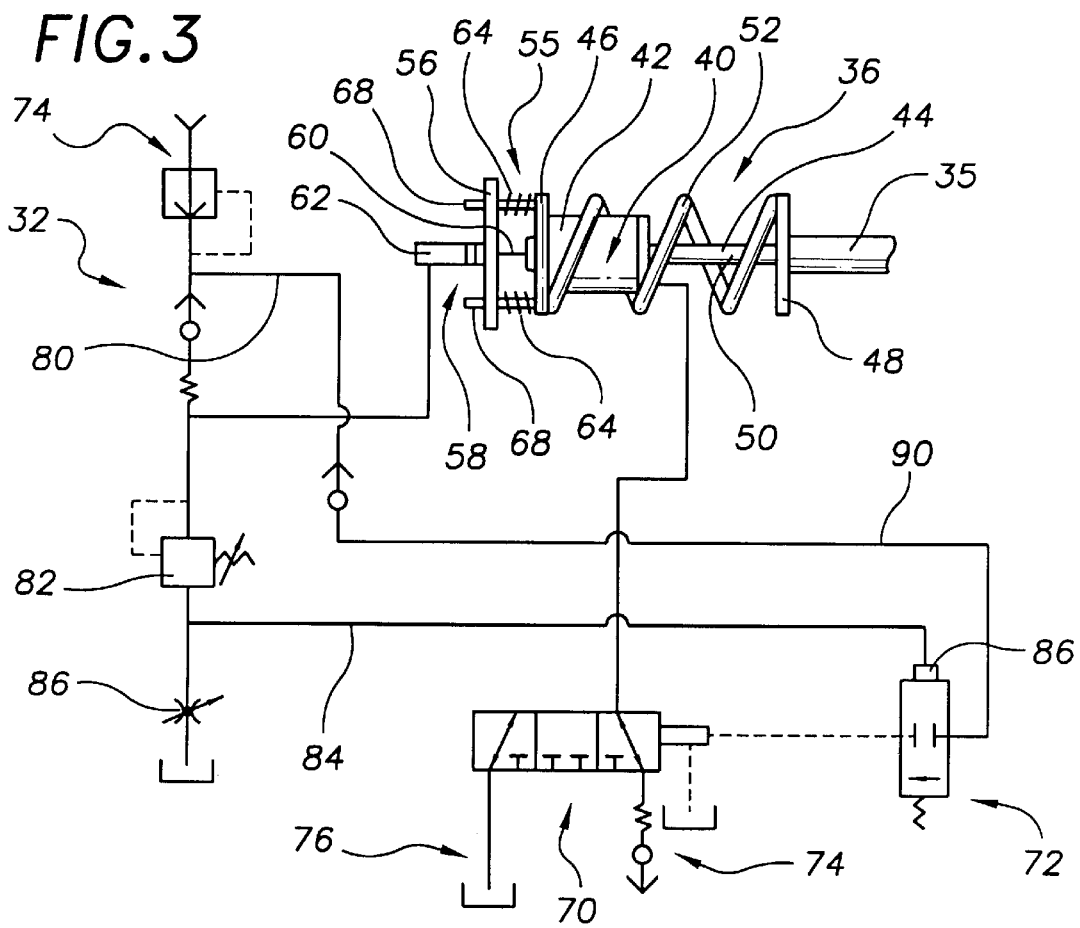
FIG. 3 is schematic diagram of an exemplary impact assembly showing the hydraulic compression cylinder assembly including a compression cylinder body and a moveable compression piston rod; a compression cylinder body mounting plate attached to the compression cylinder body; a compression piston rod mounting plate attached to the end of the compression piston rod; an impact spring installed with a first end in contact with the compression cylinder body mounting plate and a second end in contact with the compression piston rod mounting plate, and in this exemplary embodiment over the compression cylinder assembly; a base frame attachment plate; an actuator cylinder assembly having an actuator piston rod coupled to the compression cylinder mounting plate and an actuator cylinder body coupled to the base frame attachment plate; at least one actuator spring attached between the compression cylinder attachment plate and the base frame attachment plate and supplying a biasing force to bias the compression cylinder attachment plate away from the base frame attachment plate such that the actuator piston rod is biased toward and into an extended position; a number of mounting plate guide pins extending from the compression cylinder mounting plate and slidably positioned through the base frame mounting plate; the compression cylinder being in hydraulic connection with a pilot operated directional control valve itself controlled by a pilot signal controlled on/off valve such that, in response to an "off" signal from the pilot signal controlled on/off valve, pressurized hydraulic fluid from an accumulator is routed through the first pilot operated directional control valve in a first direction into the compression cylinder driving compression piston rod attachment plate toward the compression cylinder body mounting plate and compressing impact spring into a compressed configuration and in response to an "on" signal from the pilot signal controlled on/off valve, pressurized hydraulic fluid from the compression cylinder is routed through the first pilot operated directional control valve in a second direction and into a hydraulic fluid reservoir tank allowing the impact spring to rapidly move compression piston rod attachment plate away from compression cylinder body mounting plate with great force; the "on" signal being generated by compression of the actuator piston rod into the actuator cylinder body forcing hydraulic fluid from the actuator cylinder body through a sequence valve, that is adjusted to open at a hydraulic pressure above the threshold "on" hydraulic pressure level, into a on/off control hydraulic line that terminates in connection with the control input of the pilot operated on/off valve; the on/off control hydraulic line having an adjustable orifice bleeder valve in connection therewith; the adjustable orifice bleeder valve bleeding pressure from the on/off control hydraulic line until the hydraulic pressure within the on/off hydraulic line falls below the threshold "on" hydraulic pressure level causing the pilot operated on/off valve to change to the "off" state.

With reference to FIG. 2, impact assembly 32 includes a force generating mechanism, generally designated 36, and a triggering mechanism, generally designated 38. In this embodiment, delimber unit 12 is coupled to impact assembly 32 with a coupling member 35. Referring now to FIG. 3, force generating mechanism 36 includes a hydraulic compression cylinder assembly, generally designated 40, including a compression cylinder body 42 and a moveable compression piston rod 44; a compression cylinder body mounting plate 46 attached to compression cylinder body 42; a compression piston rod mounting plate 48 attached to an end 50 of compression piston rod 44; an impact spring 52 installed with a first end in contact with compression cylinder body mounting plate 46 and a second end in contact with the compression piston rod mounting plate 48, and in this exemplary embodiment over compression cylinder assembly 40; and a trigger mechanism 55 that includes a base frame attachment plate 56; an actuator cylinder assembly, generally designated 58, having an actuator piston rod 60 coupled to compression cylinder mounting plate 46 and an actuator cylinder body 62 coupled to base frame attachment plate 56; four actuator springs 64 (only two shown) attached between compression cylinder attachment plate 46 and base frame attachment plate 56 and supplying a biasing force to bias compression cylinder attachment plate 46 away from base frame attachment plate 56 such that actuator piston rod 60 is biased toward and into an extended position; and four mounting plate guide pins 68 extending from compression cylinder mounting plate 46 and slidably positioned through base frame mounting plate 56. Compression cylinder 42 is in hydraulic connection with a pilot operated directional control valve, generally designated 70. Pilot operated directional control valve 70 is controlled by a pilot signal controlled on/off valve 72. In response to an "off" signal from pilot signal controlled on/off valve 72, pressurized hydraulic fluid from an accumulator 74 is routed through first pilot operated directional control valve 70 in a first direction into compression cylinder 42 driving compression piston rod attachment plate 48 toward compression cylinder body mounting plate 46 and compressing impact spring 52 into a compressed configuration. In response to an "on" signal from pilot signal controlled on/off valve 72, pressurized hydraulic fluid from compression cylinder 42 is routed through pilot operated directional control valve 70 in a second direction and into a hydraulic fluid reservoir tank 76 allowing impact spring 52 to rapidly move compression piston rod attachment plate 48 away from compression cylinder body mounting plate 46 with great force. The "on" signal is generated by compression of actuator piston rod 60 into actuator cylinder body 62 forcing hydraulic fluid from actuator cylinder body 62 through a hydraulic line 80 through a sequence valve 82, that is adjusted to open at a hydraulic pressure above the threshold "on" hydraulic pressure, into an on/off control hydraulic line 84 that terminates in connection with the control input 86 of pilot operated on/off valve 72. To control cycling speed of impact assembly 32, on/off control hydraulic line 84 is provided with an adjustable orifice bleeder valve 86 to bleed pressure from on/off control hydraulic line 84 until the hydraulic pressure within on/off hydraulic line 84 falls below the threshold "on" hydraulic pressure level causing pilot operated on/off valve to change to the "off" state. The accumulator 74 also provides makeup hydraulic fluid to hydraulic line 80 and switching hydraulic fluid pressure through a second hydraulic line 90 to pilot operated directional control valve 70.

Figure 4A:
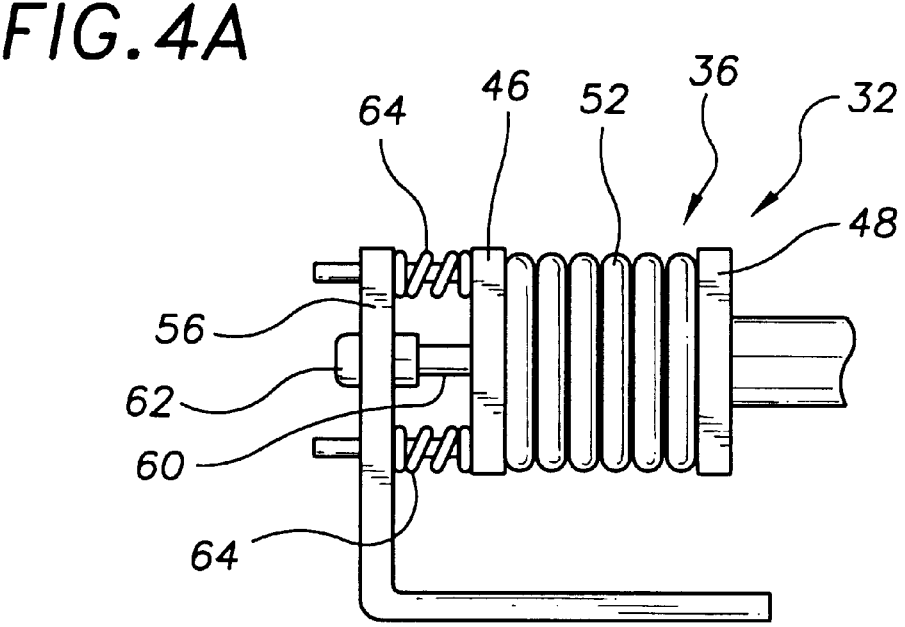
FIG. 4A is a side plan view of the impact assembly in the cocked configuration showing the hydraulic compression cylinder assembly with the moveable compression piston rod withdrawn into the compression cylinder body; the impact spring compressed between the compression cylinder body mounting plate and the compression piston rod mounting plate; the base frame attachment plate biased away from the compression cylinder mounting plate by the actuator springs; and the actuator piston rod fully extended from the actuator cylinder assembly.

Referring now to FIG. 4A, force generating mechanism 36 of impact assembly 32 is in the cocked configuration when impact spring is compressed between compression cylinder body mounting plate and compression piston rod mounting plate 48 by hydraulic compression cylinder assembly 40 (FIG. 3). Trigger mechanism 55 is set in a triggerable configuration when compression cylinder mounting plate 46 is biased away from base frame attachment plate by actuator springs 64 and actuator piston rod 60 is fully 56 extended from actuator cylinder body 62.

Figure 4B:
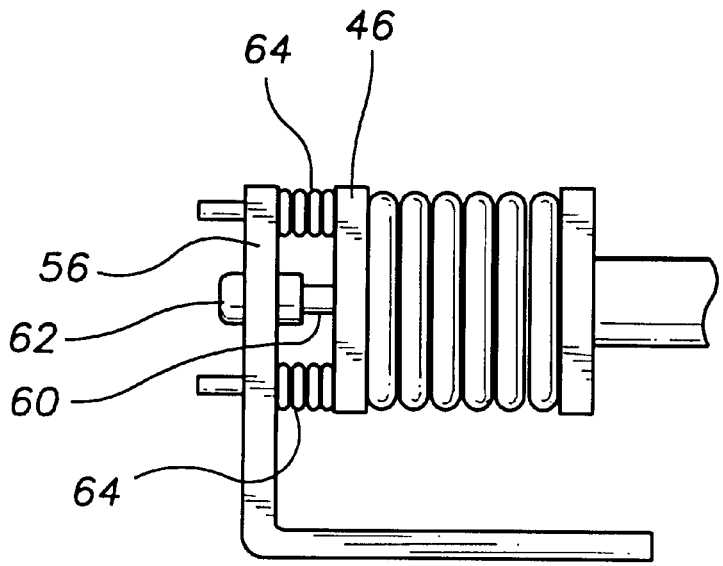
FIG. 4B is a side plan view of the impact assembly just as the impact assembly is triggered showing the hydraulic compression cylinder assembly with the moveable compression piston rod withdrawn into the compression cylinder body; the impact spring compressed between the compression cylinder body mounting plate and the compression piston rod mounting plate; the actuator springs being compressed between the base frame attachment plate and the compression cylinder mounting plate; and the actuator piston rod being fully compressed into the actuator cylinder assembly.

With reference to FIG. 4B, trigger mechanism 55 is triggered when the force from loader gripping arm 22 (FIG. 1) transmitted by a tree trunk pulling against delimbing unit 12 (FIG. 2) is sufficient to compress actuator springs between base frame attachment plate 56 and compression cylinder mounting plate 46. As actuator springs 64 are compressed, actuator piston rod 60 is compressed into actuator cylinder body 62 generating the hydraulic pressure needed to switch pilot operated directional control valve 70 (FIG. 3) into the "on" position.

Figure 4C:
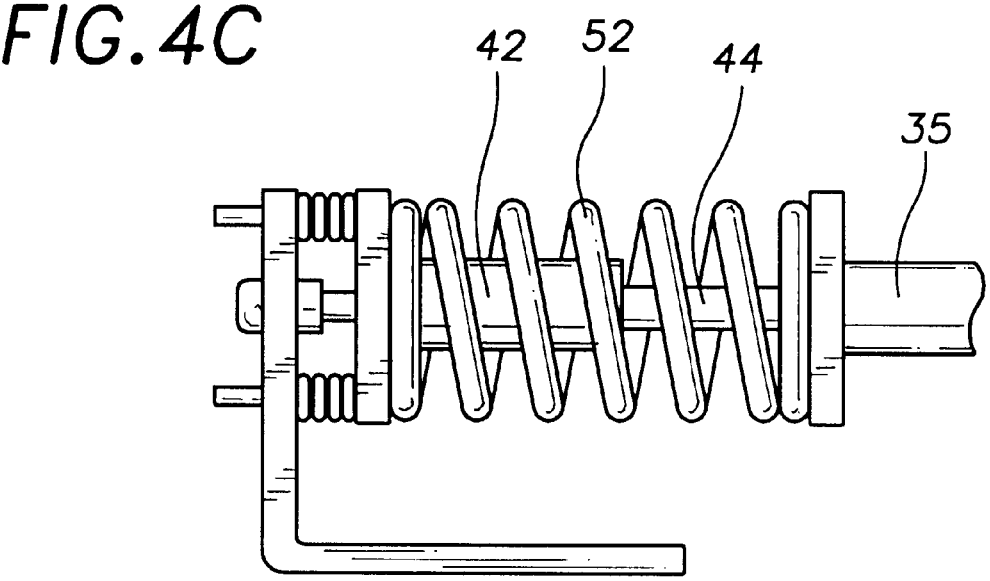
FIG. 4C is a side plan view of the impact assembly just after the impact assembly is triggered showing the hydraulic compression cylinder assembly with the moveable compression piston rod moving out from the compression cylinder body; the impact spring rapidly forcing the compression piston rod mounting plate away from compression cylinder body mounting plate; the actuator springs still compressed between the base frame attachment plate and the compression cylinder mounting plate; and the actuator piston rod fully compressed into the actuator cylinder assembly.

With reference to FIG. 4C, when pilot operated directional control valve 70 (FIG. 3) is in the "on" position, hydraulic pressure is released from compression cylinder body 42 releasing compression piston rod 44 and allowing impact spring 52 to supply an impact severing force to delimber unit 12 (FIG. 1,2) through coupling member 35 to sever a limb from the tree trunk.

Figure 4D:
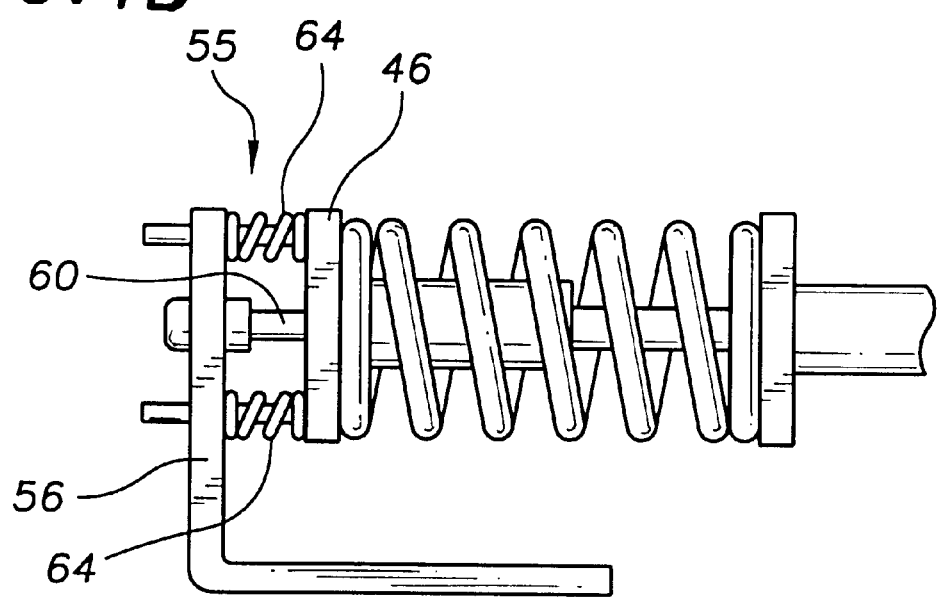
FIG. 4D is a side plan view of the impact assembly after it has completely fired and just prior to being recocked showing the hydraulic compression cylinder assembly with the moveable compression piston rod fully extended from the compression cylinder body; the impact spring fully expanded between the compression piston rod mounting plate and the compression cylinder body mounting plate; the compression cylinder mounting plate biased away from the base frame attachment plate by the actuator springs; and the actuator piston rod fully extended from the actuator cylinder assembly.

With reference to FIG. 4D, once the impact severing force is delivered to delimber unit 12 (FIG. 1,2) the trigger mechanism is reset when actuator springs 64, pilot supplied hydraulic pressure from accumulator 74 on the actuator piston rod 60, and the inertia of the delimber unit 12 moving in a rearward direction force compression cylinder mounting plate 46 away from base frame attachment plate 56 causing actuator piston rod 60 to fully extended from actuator cylinder body 62.

It can be seen from the preceding description that an improved delimber system has been provided that includes an impact assembly installed between a delimbing unit and a loader mechanism for providing additional severing impact forces when needed to sever large limbs from a tree trunk; that includes delimber unit slidably mounted on a slide carriage mounted to a base frame and an impact assembly mounted between the base frame and the delimber unit for supplying an additional severing impact force between the loader mechanism and the cutting elements of the delimber unit for severing large limbs; and that includes a base frame; a slide carriage mounted between the base frame and the delimbing unit such that the delimbing unit is slidable with respect to the base frame between a forward delimber position toward the tree trunk loader mechanism and a rearward delimber position away from the tree trunk loader mechanism; and an impact assembly mounted functionally between the base frame and the delimbing unit, the impact assembly including a force generating mechanism for generating a force transmitted between the base frame and the delimber unit to force the delimber unit into the rearward delimber position.

It is noted that the embodiment of the an improved delimber system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. In a delimber system including a delimbing unit including cutting elements, for cutting limbs extending from a tree trunk, and a tree trunk loader mechanism, for pulling the tree trunk of a tree to be delimbed through the delimbing unit such that the limbs extending from the tree trunk are severed from the tree trunk by the cutting elements, the improvement comprising:

a base frame;

a slide carriage mounted between said base frame and the delimber unit such that the delimber unit is slidable with respect to said base frame between a forward delimber position toward the tree trunk loader mechanism and a rearward delimber position away from the tree trunk loader mechanism; and an impact assembly mounted functionally between said base frame and the delimber unit, said impact assembly including a force generating mechanism for generating a force transmitted between said base frame and the delimber unit to force the delimber unit into said rearward delimber position.

2. The improved delimber system of claim 1 wherein said impact assembly further comprises:

a triggering mechanism including a sensing mechanism for sensing a tree trunk pulling force between the tree trunk loader mechanism and the delimber unit; said sensing mechanism triggering said force generating mechanism upon detecting a predetermined threshold level tree trunk pulling force between the tree trunk loader mechanism and the delimber unit.

3. The improved delimber system of claim 2 wherein said force generating mechanism of said impact assembly comprises:

a hydraulic compression cylinder assembly including a compression cylinder body and a moveable compression piston rod;

a compression cylinder body mounting plate attached to said compression cylinder body;

a compression piston rod mounting plate attached to a rod end of said compression piston rod; and an impact spring installed with a first end in contact with said compression cylinder body mounting plate and a second end in contact with said compression piston rod mounting plate.

4. The improved delimber system of claim 3 wherein said triggering mechanism of said impact assembly comprises:

a base frame attachment plate attached said base frame;

an actuator cylinder assembly having an actuator piston rod coupled to said compression cylinder mounting plate and an actuator cylinder body coupled to said base frame attachment plate; and at least one actuator spring attached between said compression cylinder attachment plate and said base frame attachment plate and supplying a biasing force to bias said compression cylinder attachment plate away from said base frame attachment plate such that said actuator piston rod is biased toward and into an extended position.

5. The improved delimber system of claim 4 wherein said impact assembly further comprises:

a number of mounting plate guide pins extending from said compression cylinder mounting plate and slidably positioned through said base frame attachment plate.

6. The improved delimber system of claim 3 wherein:

said hydraulic compression cylinder assembly is in hydraulic connection with a pilot operated directional control valve that is controlled by a pilot signal controlled on/off valve such that, in response to an "off" signal from said pilot signal controlled on/off valve, pressurized hydraulic fluid from an accumulator is routed through said first pilot operated directional control valve in a first direction into said compression cylinder driving said compression piston rod attachment plate toward said compression cylinder body mounting plate and compressing said impact spring into a compressed configuration and in response to an "on" signal from said pilot signal controlled on/off valve, pressurized hydraulic fluid from said compression cylinder is routed through said first pilot operated directional control valve in a second direction and into a hydraulic fluid reservoir tank allowing said impact spring to rapidly force said compression piston rod attachment plate away from said compression cylinder body mounting plate.

7. The improved delimber system of claim 6 wherein said impact assembly further comprises:

said "on" signal is generated by compression of said actuator piston rod into said actuator cylinder body forcing hydraulic fluid from said actuator cylinder body through a sequence valve, that is adjusted to open at a hydraulic pressure above said threshold "on" hydraulic pressure, into an on/off control hydraulic line that terminates in connection with said control input of said pilot operated on/off valve.

8. The improved delimber system of claim 7 wherein:

said on/off control hydraulic line has an adjustable orifice bleeder valve in connection therewith;

said adjustable orifice bleeder valve bleeding pressure from said on/off control hydraulic line to cause said hydraulic pressure within said on/off hydraulic line falls below said threshold "on" hydraulic pressure level causing said pilot operated on/off valve to change to said "off" state.

* * * * *